Jan. 2, 1951 D. K. MACLEOD 2,536,758
CULVERT PIPE
Filed March 4, 1948
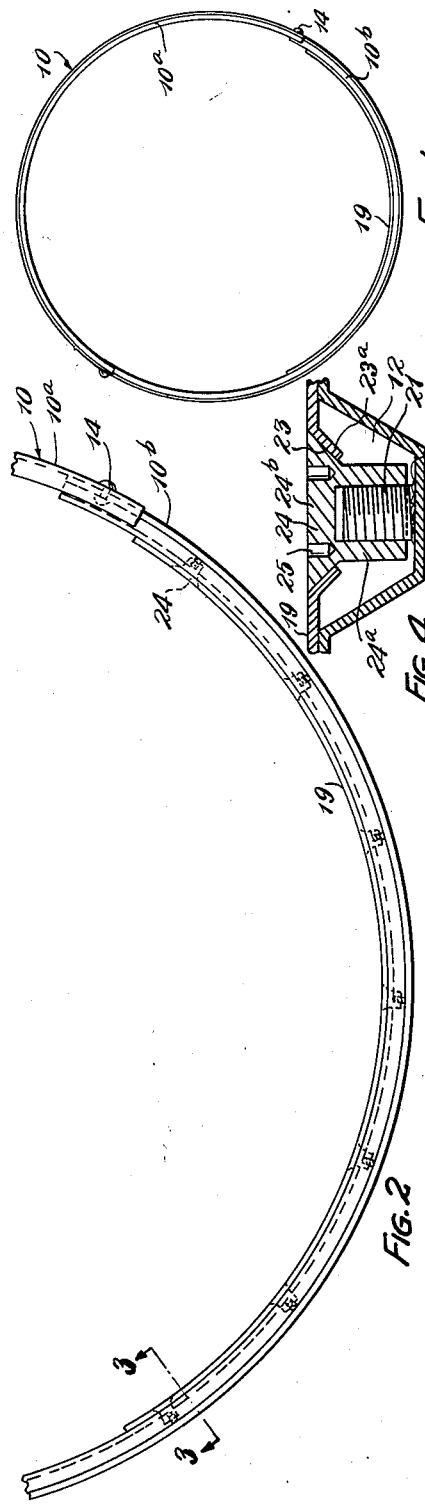
INVENTOR.
DONALD KEITH MACLEOD
BY
Kwis, Hudson, Boughton & Williams
ATTORNEYS Patented Jan. 2, 1951

2,536,758

UNITED STATES PATENT OFFICE 2,536,758

CULVERT PIPE

Donald Keith Macleod, Wooster, Ohio, assignor to United Steel Fabricators, Inc., Wooster, Ohio, a corporation of Ohio Application March 4, 1948, Serial No. 12,969

4 Claims. (Cl. 138—70)

This invention relates to pipe of the corrugated sheet metal type used for drainage culverts and similar purposes and, more particularly, to an improved construction for metal pipe of this kind.

It has been recognized heretofore that when corrugated metal pipe is used in drainage culverts and the like, the circumferentially extending alternate ridges and grooves of the corrugations present an irregular inner surface across which water must flow in passing through the pipe. The water flowing through pipe of this kind is usually drainage water which is laden with silt such that the water exerts a destructive scouring action on the pipe and, in addition, the grooves form small catch basins in which the silt is prone to settle. The collection of silt in the grooves promotes rusting and deterioration at these points.

Since the stream of drainage water usually covers only the bottom segment of the pipe circumference it is this portion of the pipe which is particularly subject to the destructive forces mentioned above and ordinarily wears out in advance of other portions of the pipe. An attempt has been made heretofore to meet this situation by using a liner in the bottom portion of the pipe to serve as a combined wear shield and pavement. The matter of attaching the liner to the corrugated wall of the pipe has, however, presented certain problems which in the constructions heretofore proposed have prevented the attainment of the full value of the liner feature.

As its principal object, the present invention therefore provides an improved construction for corrugated culvert pipe of the type having, in the bottom segment thereof, a liner serving as a combined wear shield and pavement and wherein novel connecting means is employed for attaching the liner to the corrugated wall.

Another object of this invention is to provide an improved culvert pipe of the character mentioned in which the connecting means for the liner permits this member to be more easily installed without producing obstructions or surface irregularities which would interfere with a smooth flow through the pipe, and also permits the liner to be readily renewed from time to time as wear occurs, without causing damage to the pipe.

Still another object is to provide an improved construction for a culvert pipe of this kind in which novel connecting means for attaching the liner to the corrugated wall includes studs located in certain of the grooves of the corrugations and engaged by holding members extending through the liner and countersunk into the surface thereof.

The invention can be further briefly summarized as consisting in certain novel combinations and arrangements of parts hereinafter described and particularly set out in the claims hereof.

In the accompanying sheet of drawings:

Fig. 1 is an end view of a culvert pipe embodying the present invention;

Fig. 2 is an end view showing the lower portion only of the culvert pipe, but on a larger scale;

Fig. 3 is a partial longitudinal section taken through the culvert pipe, as indicated by line 3—3 of Fig. 2, further illustrating the construction thereof and showing the fastening means for the combined wear shield and pavement;

Fig. 4 is a larger scale fragmentary longitudinal section taken through one of the fasteners for the combined wear shield and pavement; and Fig. 5 is a partial longitudinal section similar to Fig. 3 but showing a culvert pipe in which the adjacent pipe sections are connected in a different manner.

The drawings show a culvert pipe 10 made of sheet metal and having corrugations 11 therein which extend circumferentially of the pipe to reinforce the same. The corrugations can be of any desired cross-sectional shape and are here shown as being of the so-called "box" type. The corrugations are spaced apart longitudinally of the pipe and form alternate groves and ridges 12 and 13 inside the pipe. Each length or section of the culvert pipe 10 can be made from a single sheet of corrugated metal which is rolled to circular form and its adjacent edges connected together, or as shown in Fig. 1 can be made from two substantially semi-circular corrugated sheets 10a and 10b disposed with their ends in overlapping relation and connected together by rivets 14 so as to aggregate the full circumference of the pipe. The culvert pipe 10 can be a single length of pipe or, as shown in Fig. 3, can be formed by two aligned sections 15 and 16 which have their adjacent ends in telescoping relation and connected together as by means of the rivets 17 to form the joint 18. Although the pipe sections 15 and 16 are here shown as being connected by rivets, they could be connected by suitable welds or welding which in many cases would be preferable to rivets.

For the reasons explained in the early part of this specification, it is desirable to provide the bottom segment of the culvert pipe 10 with a liner 19 which serves as a combined wear shield and pavement. The liner 19 comprises a plate structure which extends longitudinally within the pipe 10 and is curved transversely to substantially the same curvature as the wall of the pipe. The liner has a transverse arcuate dimension which corresponds with the arcuate length of the segment of the pipe desired to be covered and protected. When mounted in the culvert pipe 10, the liner 19 is supported by the tops of the ridges 13 and extends in spanning relation across the grooves 12 and across the joint 18 formed by the connected ends of the pipe sections 15 and 16. The liner 19 can be formed from a single metal plate or strip or, as shown in Fig. 3, may be composed of two aligned sections 19a and 19b which are located in the respective pipe sections 15 and 16 and have their adjacent ends in overlapping relation so as to form a joint 20 substantially at the location of the joint 18 connecting the pipe sections.

For connecting the liner 19 with the corrugated wall of the culvert pipe 10, threaded studs 21 are provided in certain of the grooves 12 and have their outer ends connected to the bottoms of the grooves by means of the welding 22. The liner 19 is provided with countersunk openings 23 in alignment with the studs 21, and holding members 24 engage the studs through these openings for holding the liner against the tops of the ridges 13. These countersunk openings 23 are defined by inwardly deflected portions 23a of the liner and have substantially the shape of an inverted truncated cone which extends downwardly into the groove 12.

The holding members 24 each comprise a nut-like member having an internally threaded hollow stem 24a adapted to be screwed onto the stud 21 and a head portion 24b which engages in and substantially fills the recess of the countersunk opening 23. The head portion 24b has a flat top and when the holding member has been tightened down on the stud 21 this flat top is substantially flush with the surface of the liner 19 so that there will be no upstanding projection and the liner will have a smooth surface adapted to permit an unobstructed flow of water through the culvert pipe 10. The head portion 24b of the holding member 24 is shaped to permit the use of a suitable wrench or tool thereon for tightening this member on the stud 21. In this instance the head portion 24b is provided with spaced recesses 25 for accommodating a spanner wrench.

Fig. 5 of the drawing shows a corrugated culvert pipe 26 which is similar to the culvert pipe 10 described above and also has a liner 27 therein corresponding with the liner 19 and forming a combined wear shield and pavement. The culvert pipe 26 comprises aligned sections 26a and 26b, which may represent two long lengths of pipe whose adjacent ends are to be joined together in the field, and a connecting band 28 for connecting such adjacent ends. The connecting band 28 is also of corrugated form and the corrugations of the end portions thereof which telescope around the end portions of the main pipe sections 26a and 26b register with corrugations of the latter. The band 28 is of the clamp type and is shown in Fig. 5 as having been drawn tight around the main pipe sections 26a and 26b.

The liner 27 can be formed by aligned transversely curved plate members 27a, 27b and 27c, of which the members 27a and 27b are located respectively in the pipe sections 26a and 26b and the intermediate member 27c is located in the connecting band 28. As shown in Fig. 5, the adjacent ends of these liner members are disposed in overlapping relation to each other to form the joints 30 and 31. Each of the liner members are connected with the respective pipe sections and band in which they are located by means of fastenings comprising the threaded studs 21 and the holding members 24 described above.

From the foregoing description and the accompanying drawing it will now be readily understood that this invention provides an improved construction for corrugated culvert pipe in which a liner located in the bottom segment of the pipe forms a combined shield and paving which prevents a destructive scouring action on this portion of the pipe by silt-laden water and also prevents the silt from collecting in the grooves of the corrugations. It will also be understood that the improved construction provides novel means for connecting the liner with the corrugated wall of the pipe in such a manner that the liner can be quickly and easily installed and can be readily removed and replaced without damage to the pipe when the liner has become worn. It will be seen, furthermore, that the connecting devices for the liner are housed in the grooves of the corrugations and are thus protected and, moreover, because of the use of these connecting devices the liner is devoid of projections on which debris could collect and hinder the flow of water through the pipe.

Although the improved culvert pipe has been illustrated and described herein to a somewhat detailed extent, it will be understood of course, that the invention is not to be regarded as being correspondingly limited in scope, but includes all changes and modifications coming within the terms of the claims hereof.

Having thus described my invention, I claim:

1. A culvert pipe comprising, a metal conduit having longitudinally spaced circumferentially extending box-type corrugations formed in the wall thereof and providing alternate flat-top ridges and flat-bottom grooves, a combined shield and paving member extending longitudinally within said conduit and overlying the bottom segment only of the conduit circumference, said member being a metal plate curved transversely to substantially the curvature of said circumference and removably supported by the flat tops of said ridges, portions of said member overlying certain of said grooves having openings therein at spaced points, and two-part threaded fasteners connecting said member with the conduit wall at said spaced points and adapted to permit the removal of said member without damage to said conduit, said two-part fasteners comprising threaded lower elements located in said certain grooves and welded to the flat-bottoms thereof and threaded upper elements extending through the openings of said member and engaging said lower elements.

2. A culvert pipe comprising, a metal conduit having longitudinally spaced circumferentially extending corrugations formed in the wall thereof and providing alternate ridges and grooves, a combined shield and paving member extending longitudinally within said conduit and overlying the bottom segment only of the conduit circumference, said member being a metal plate curved transversely to substantially the curvature of said circumference and supported by the tops of said ridges, portions of said member overlying certain of said grooves having openings therein, studs attached to the conduit wall and located in said certain grooves in aligned relation to said openings, and holding elements engaging said studs through said openings and adapted to hold said member against said ridges.

3. A culvert pipe comprising, a metal conduit having longitudinally spaced circumferentially extending corrugations formed in the wall thereof and providing alternate ridges and grooves, a combined shield and paving member extending longitudinally within said conduit and overlying the bottom segment only of the conduit circumference, said member being a metal plate curved transversely to substantially the transverse curvature of said conduit wall and supported by the tops of said ridges, portions of said member overlying certain of said grooves having countersunk openings therein, studs attached to the conduit wall and located in said certain grooves in aligned relation to said openings, and holding elements engaging said studs through said openings for holding said member against said ridges, said holding elements having heads shaped to lie wholly in said countersunk openings so as to leave the surface of said member substantially smooth and unobstructed.

4. In conduit construction, a pair of substantially aligned metal conduit sections having longitudinally spaced circumferentially extending corrugations formed in the walls thereof and providing alternate ridges and grooves, means connecting the adjacent ends of said conduit sections so as to form a continuous conduit passage, a combined shield and paving member extending longitudinally within said conduit passage in spanning relation to said connecting means and overlying the bottom segment only of the conduit passage circumference, said member comprising an elongated metal plate structure having a preformed transverse curvature corresponding substantially with the transverse curvature of the walls of said conduit sections and said member being supported by the tops of said ridges, portions of said member overlying certain of said grooves having countersunk openings therein, studs attached to the walls of said conduit sections and located in said certain grooves in aligned relation to said openings, and holding elements engaging said studs through said openings for holding said members against said ridges, said holding elements having heads shaped to lie wholly in said countersunk openings so as to leave the surface of said member substantially smooth and unobstructed.

DONALD KEITH MACLEOD.

REFERENCES CITED

The following references are of record in the file of this patent:

UNITED STATES PATENTS

| Number | Name | Date |
|---|---|---|
| 1,648,148 | Quinn | Nov. 8, 1927 |
| 2,081,872 | Kahn et al. | May 25, 1937 |